(12) United States Patent
Sugihara (10) Patent No.: US 8,953,121 B2
(45) Date of Patent: Feb. 10, 2015

(54) LIQUID CRYSTAL DISPLAY DEVICE

(75) Inventor: Toshinori Sugihara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 180 days.

(21) Appl. No.: 13/642,648

(22) PCT Filed: Feb. 24, 2011

(86) PCT No.: PCT/JP2011/054097
§ 371 (c)(1),
(2), (4) Date: Oct. 22, 2012

(87) PCT Pub. No.: WO2011/135909
PCT Pub. Date: Nov. 3, 2011

(65) Prior Publication Data
US 2013/0038815 A1    Feb. 14, 2013

(30) Foreign Application Priority Data

Apr. 26, 2010  (JP) ................................. 2010-100809

(51) Int. Cl.
*G02F 1/1335* (2006.01)
*G02B 5/22* (2006.01)

(52) U.S. Cl.
CPC ............ *G02B 5/22* (2013.01); *G02F 1/133603* (2013.01); *G02F 1/133609* (2013.01); *G02F 2001/133624* (2013.01)
USPC ........................................................ 349/106

(58) Field of Classification Search
USPC ........................................................ 349/106
See application file for complete search history.

(56) References Cited

U.S. PATENT DOCUMENTS

| | | | |
|---|---|---|---|
| 7,530,722 B2 * | 5/2009 | Murai ........................... | 362/613 |
| 7,830,472 B2 | 11/2010 | Kawana et al. | |
| 8,040,467 B2 | 10/2011 | Kawana et al. | |
| 8,704,979 B2 * | 4/2014 | Park et al. ...................... | 349/112 |

FOREIGN PATENT DOCUMENTS

| | | |
|---|---|---|
| JP | 58-129421 A | 8/1983 |
| JP | 2004-245996 A | 9/2004 |
| JP | 2006-047975 A | 2/2006 |
| JP | 2007-025285 A | 2/2007 |

OTHER PUBLICATIONS

An International Search Report, dated Mar. 29, 2011, in International Application No. PCT/JP2011/054097.

* cited by examiner

*Primary Examiner* — Timothy L Rude
(74) *Attorney, Agent, or Firm* — Lowe Hauptman & Ham, LLP (57) ABSTRACT

In a liquid crystal display device which uses a white LED as the light source, in order to avoid/suppress the reduction in the speed of response of the liquid crystal while increasing the color reproducibility and red chromaticity without the use of a special purpose color filter, a band cut filter which absorbs the wavelength component neighboring orange in light that is transmitted is provided between the liquid crystal display and the backlight unit.

14 Claims, 5 Drawing Sheets

COLOR REPRODUCTIVITY AND RED x Value y Value

| absorptance peak(nm) | Non | 560 | 565 | 570 | 575 | 580 | 585 | 590 | 595 | CCFL |
|---|---|---|---|---|---|---|---|---|---|---|
| RATIO TO NTSC(%) | about 69 | about 80 | about 88 | about 88 | about 94 | about 96 | about 96 | about 93 | about 90 | about 73 |
| REDCIE1931x | 0.6341 | 0.6494 | 0.6538 | 0.6538 | 0.6579 | 0.6609 | 0.6615 | 0.658 | 0.6512 | 0.6383 |
| REDCIE1931y | 0.3523 | 0.3333 | 0.327 | 0.327 | 0.3204 | 0.3141 | 0.3041 | 0.3013 | 0.3009 | 0.3429 |

Fig.6

LIQUID CRYSTAL DISPLAY DEVICE

RELATED APPLICATIONS

The present application is a National Stage of International Application No. PCT/JP2011/054097, filed Feb. 24, 2011 and claims priority from, Japanese Application No. 2010-100809, filed Apr. 26, 2010.

TECHNICAL FIELD

The present invention relates to a liquid crystal display device using a white LED lamp as a backlight light source.

BACKGROUND ART

As a light source for a backlight unit of a liquid crystal display device, a white LED lamp, which emits white light, has been increasingly adopted instead of a conventional CCFL (cold cathode fluorescent lamp). In contrast with the conventional CCFL, the white LED lamp is advantageous in, for example, that no mercury is used therein, that it does not need to be provided with a high voltage circuit for electric discharge nor means for cutting noise from the circuit, and that it is able to be made compact easily.

On the other hand, in a liquid crystal display device that uses a conventional CCFL as a light source, heat generated by the CCFL is used to warm a liquid crystal panel. By warming the liquid crystal panel, it is possible to increase the liquid crystal response speed, to thereby reduce degradation of image display quality. However, the white LED lamp generates less heat than the CCFL, and thus, if the white LED lamp is used as a light source, it is sometimes difficult to sufficiently warm the liquid crystal panel. In such a case, the liquid crystal response speed is degraded, which may invite degradation of the image display quality.

In a case where the white LED lamp is used as a light source for an edge light type backlight, the white LED lamp is arranged at a periphery of the liquid crystal panel. In particular, in a case of a liquid crystal display device using a large-size liquid crystal panel, the liquid crystal panel is prone to in-plane temperature distribution. This invites distribution of liquid crystal response speed in the plane of the liquid crystal panel. In a case where the white LED lamp is used in such an edge light type liquid crystal display device, insufficient warming of the liquid crystal panel and occurrence of the distribution of the response speed may degrade the display quality of images still more than in a case where the white LED lamp is used as a light source in a direct type liquid crystal display device.

Examples of a method for reducing degradation of the response speed caused by insufficient warming of liquid crystal include, for example, a method disclosed in JP-A-S58-129421, where a polarization plate with a transparent conductive film is put on a liquid crystal display element to be used as a heater to warm liquid crystal to thereby achieve a faster response.

Furthermore, in the case of a liquid crystal display device using a white LED lamp as a backlight light source, red chromaticity may be degraded due to light emission characteristics of the white LED lamp. To prevent this, there has been invented a method of reducing degradation of red chromaticity by using a dedicated color filter corresponding to the light emission characteristics of the white LED lamp.

CITATION LIST

Patent Literature 1: JP-A-S58-129421

SUMMARY OF INVENTION

Technical Problem

However, with the liquid crystal display element disclosed in JP-A-S58-129421, a large amount of power is required to drive the heater, and this may invite increased power consumption in a liquid crystal display device.

Besides, in some cases, a dedicated color filter for the white LED lamp is made of a material that is different from a material of a color filter for the conventional CCFL. Thus, in such cases, it is necessary to stop a color filter production line to replace or add material on the color filter production line. This leads to a lower operation rate of the color filter production line, which results in increased production cost of the color filter, and further leads to increased production cost of the liquid crystal panel.

In view of the foregoing, an object of the present invention is to provide a liquid crystal display device using a white LED lamp as a light source, the liquid crystal display device being capable of reducing degradation of liquid crystal response speed and enhancing color productivity and red chromaticity without using a dedicated color filter for the white LED lamp.

Solution to Problem

To achieve the above object, according to the present invention, a liquid crystal display device includes a liquid crystal display panel and a backlight unit disposed at a rear side of the liquid crystal display panel. Here, the backlight includes a white LED lamp that emits white light having intensity peaks at least two different wavelengths, and the liquid crystal display device includes a specific wavelength component absorbing portion that absorbs a wavelength component in a specific range from the white light that passes through the specific wavelength component absorbing portion.

With this configuration, the specific wavelength component absorbing portion cuts (absorbs) a specific wavelength component included in the white light emitted from the backlight unit. By making use of the light resulting from removing the specific wavelength component from the white light, it is possible, with a liquid crystal display device provided with a color filter for conventional CCFLs, to display an image with the same or higher color reproductivity and red chromaticity in comparison with a liquid crystal display device using a conventional CCFL.

Thus, there is no need of providing a liquid crystal display device with a dedicated color filter adapted to spectrum distribution of the white LED lamp, and this eliminates the need of stopping a production line to replace or add material on a color filter production line. This helps reduce degradation of the operation rate of the production line, thereby reducing increase in cost.

According to an embodiment of the present invention, in the above-described configuration, the specific wavelength component absorbing portion may be one that converts energy of absorbed light into heat. With this configuration, the liquid crystal display panel and liquid crystal filled therein are warmed by the heat from the specific wavelength component absorbing portion. By warming the liquid crystal, it is possible to achieve a faster response and reduce degradation of display quality.

According to an embodiment of the present invention, in the above-described configuration, the specific wavelength component absorbing portion may be a band cut filter formed in a sheet shape, a film shape, or a plate shape, and may be disposed between the liquid crystal display panel and the backlight unit. This configuration helps facilitate handling of the band cut filter. Incident light on the band cut filter is planar light that is uniformized in a plane, and thus, the band cut filter generates heat uniformly or substantially uniformly in a plane thereof. Thus, the liquid crystal display panel is also warmed uniformly or substantially uniformly, and thereby, it is possible to reduce occurrence of temperature distribution in the liquid crystal, and thus to reduce occurrence of response speed distribution.

With the above-described configuration with the band cut filter formed in a sheet shape, a film shape, or a plate shape, it is possible to easily change the location of the band cut filter. In a configuration in which the backlight unit is provided with a substrate having, on a side thereof closer to the liquid crystal display panel, the white LED lamp arranged in a two-dimensional manner, the band cut filter may be disposed, for example, as follows. The band cut filter may be disposed between an optical sheet unit that includes one optical sheet or a plurality of optical sheets and the liquid crystal display panel, between a plurality of optical sheets included in an optical sheet unit, between the optical sheet unit and a diffusion plate disposed at a front side of the backlight unit, or between the diffusion plate and the backlight unit.

According to an embodiment of the present invention, in the above-described configuration, the backlight unit may be provided with a light guide plate having a light exit surface provided on the liquid crystal display panel side and a light entrance surface provided at a periphery of the light exit surface, the light guide plate may also serve as a diffusion plate, and the white LED lamp may be disposed such that light therefrom is incident on the light entrance surface.

In this case, the band cut filter may be disposed, for example, between an optical sheet unit that includes one optical sheet or a plurality of optical sheets and the liquid crystal display panel, between a plurality of optical sheets included in an optical sheet unit, or between the optical sheet unit and the backlight unit. Furthermore, the light guide plate and the diffusion plate may be separately provided, and in such a case, the band cut filter may be disposed, in addition to the above-mentioned locations, between the light guide plate and the diffusion plate.

According to an embodiment of the present invention, the band cut filter may also have a function of an optical sheet included in an optical sheet unit that includes one optical sheet or a plurality of optical sheets, the band cut filter being disposed in the optical sheet unit. With this configuration, the optical sheet unit and the band cut filer can be combined, to thereby reduce the number of components used in the liquid crystal display device.

According to an embodiment of the present invention, in the above-described configuration, the white LED lamp may include an LED element and a fluorescence substance that is excited by light emitted from the LED element emit light having a different wavelength from the light emitted from the LED element.

According to an embodiment of the present invention, the white LED lamp may be a lamp that includes a blue LED element and a YAG fluorescence substance, or may be a lamp that includes a blue LED element, a green fluorescence substance, and a red fluorescence substance. In such configurations, the specific wavelength component absorbing portion (the band cut filter) may be one that absorbs a wavelength component in the vicinity of orange. In other words, as the specific wavelength component absorbing portion (the band cut filter), one whose peak absorptance wavelength is a wavelength between 560 nm and 590 nm may be adopted. Furthermore, it is preferable to adopt one whose peak absorptance wavelength is a wavelength between 560 nm and 590 nm.

Advantageous Effects of Invention

According to the present invention, it is possible to provide a liquid crystal display device using a white LED lamp as a light source in which degradation of liquid crystal response speed is reduced and color productivity and red chromaticity are enhanced without using a dedicated color filter for the white LED lamp.

DESCRIPTION OF EMBODIMENTS

Figure 1:
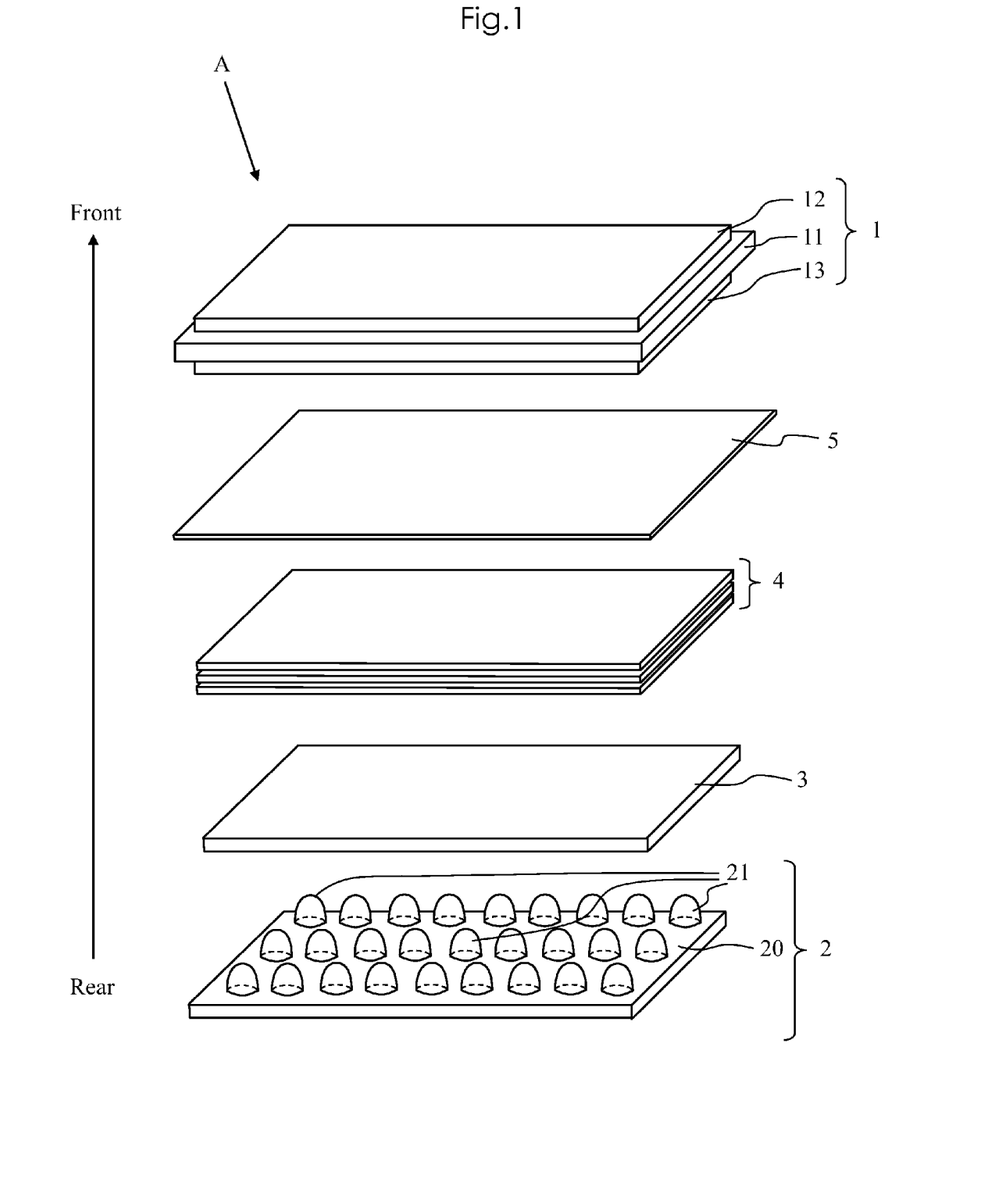
FIG. 1 is an exploded perspective view of a liquid crystal display device according to the present invention.

Embodiments of the present invention will be described below with reference to the accompanying drawings. FIG. 1 is an exploded perspective view of a liquid crystal display device according to the present invention. As shown in FIG. 1, a liquid crystal display A is one that is provided with a direct type backlight. The liquid crystal display device A includes a liquid crystal display panel 1 and a backlight unit 2 disposed at a rear side of the liquid crystal display panel 1.

The liquid crystal display panel 1 has a liquid crystal panel 11 in which liquid crystal is sealed, a polarization plate 12 which is put on a front surface (a side closer to a viewer) of the liquid crystal panel 11, and a polarizing plate 13 which is put on a rear surface (a side closer to the backlight unit 2) of the liquid crystal panel 11. The liquid crystal panel 11 includes an array substrate which includes a switching element such as a TFT (thin film transistor), a counter substrate which is disposed to face the array substrate and provided with a color filter, and a liquid crystal that is filled between the array substrate and the counter substrate (all unillustrated). Here, the color filter for the counter substrate is configured in the same manner as a color filter used in a liquid crystal display device provided with a CCFL as a light source. The liquid crystal panel 1 may be configured such that the array substrate is provided with a color filter and the counter substrate is provided with a transparent electrode. In this configuration, too, the color filter is configured in the same manner as a color filter used in a liquid crystal display device provided with a CCFL as a light source.

The backlight unit 2 is provided with a substrate 20 and a plurality of white LED lamps 21 which are arranged on the substrate 20 in a two-dimensional manner. The backlight unit 2 may be configured such that the white LED lamps 21 are mounted on the substrate 20. In the case where the white LED lamps 21 are mounted on the substrate 20, the substrate 20 may be provided with conductors for supplying power to the white LED lamps 21. Descriptions will be given later of the characteristics and the like of the LED lamps 21.

As shown in FIG. 1, in the liquid crystal display device A, between the liquid crystal display panel 1 and the backlight unit 2, there are arranged a diffusion plate 3, an optical sheet unit 4, and a band cut filter 5, in this order from the backlight unit 2 side.

The diffusion plate 3 is attached so as to cover the front surface of the backlight unit 2. The diffusion plate 3 receives light from the backlight unit 2 and scatters (diffuses) the received light. In other words, when the light from the backlight unit 2 is incident on the diffusion plate 3, the light is scattered and diffused in all planar directions.

In the liquid crystal display device A shown in FIG. 1, the optical sheet unit 4 includes three optical sheets, but this is not meant as a limitation; the optical sheet unit 4 may include more optical sheets or fewer optical sheets than three. The optical sheet unit 4 includes, for example, a diffusion sheet, a lens sheet, and the like. The diffusion sheet has the same function as the diffusion plate 3 but it is thinner than the diffusion plate 3. The lens sheet, which is a sheet that deflects a radiation characteristic of light (condenses light), condenses incident light, to thereby increase emission brightness. There may be used optical sheets other than the above-described optical sheets.

Light emitted from the backlight unit 2 is diffused by passing through the diffusion plate 3, to be incident on the optical sheet unit 4. The light incident on the optical sheet unit 4 is further subjected to, for example, diffusion and condensation to thereby enhance the emission brightness, to be incident on the band cut filter 5. The band cut filter 5, which is a specific wavelength component absorbing portion, is an optical element that absorbs (cuts) a predetermined wavelength component included in the light that passes therethrough. By the band cut filter 5 cutting the predetermined wavelength component, it is possible to achieve enhanced color reproductivity and red chromaticity even in a case where a color filter for a CCFL is used. Descriptions will be given later how the band cut filter 5 enhances the color reproductivity and the red chromaticity.

Figure 2:
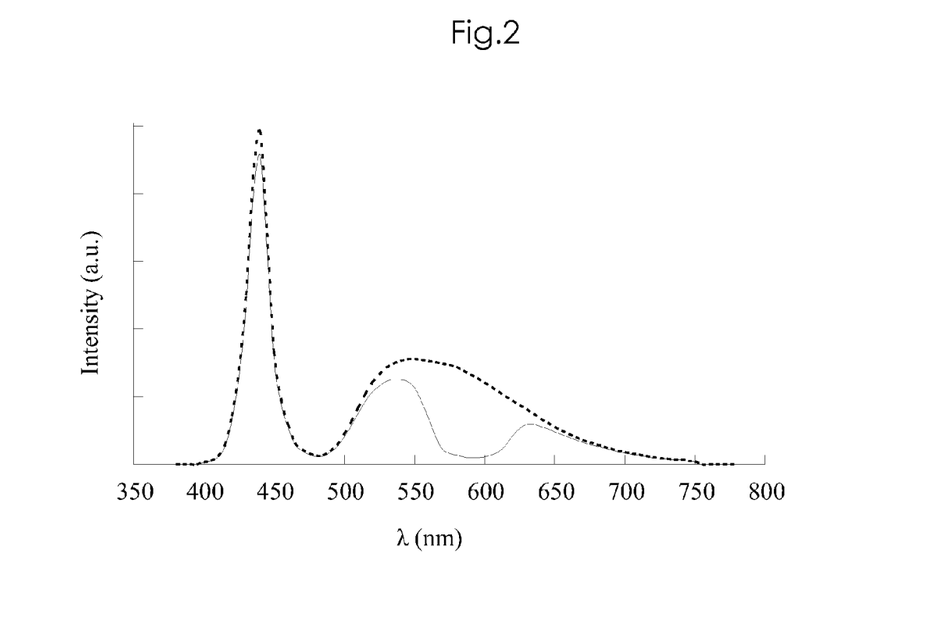
FIG. 2 is a diagram showing a light emission spectrum of a white LED lamp using a YAG fluorescence substance and a blue LED.

The white LED lamp 21, which is provided with a blue LED element and a YAG (Yttrium Aluminum Garnet) fluorescence substance disposed so as to surround the blue LED element, is what is called a pseudo white LED lamp. FIG. 2 is a diagram showing a light emission spectrum of a white LED lamp using a YAG fluorescence substance and a blue LED. In FIG. 2, spectrum distribution of light emitted from the white LED lamp 21 is indicated by a dashed line. As shown in FIG. 2, there are two peaks in the spectrum distribution of light emitted from the white LED lamp 21, that is, one in the vicinity of blue (wavelength of around 440 nm) and the other in the vicinity of yellow (wavelength of around 550 nm). Now a description will be given below of light emission of the white LED lamp.

As described above, the white LED lamp is provided with a YAG fluorescence substance which is disposed so as to surround a blue LED element which emits blue light. The YAG fluorescence substance has a characteristic such that, when it is irradiated with blue light, it is activated by the blue light to emit yellow light. The white LED lamp is configured such that part of the blue light emitted from the blue LED element hits the YAG fluorescence substance. That is, the white LED lamp, which is configured such that the blue light from the blue LED element and the yellow light from the YAG fluorescence substance are emitted outside, emits (pseudo) white light resulting from mixing of the two colors.

Figure 3:
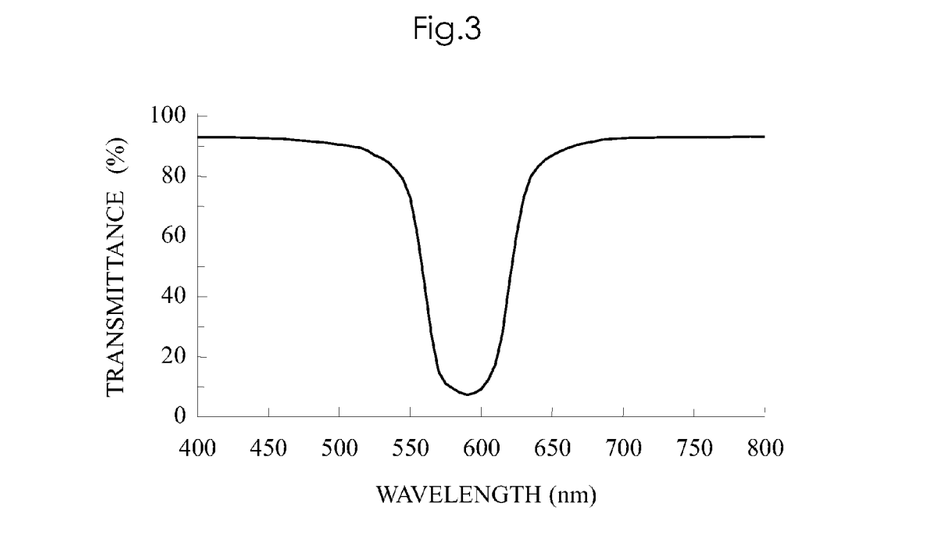
FIG. 3 is a diagram showing a light transmittance spectrum of a band cut filter.

Next, a description will be given of the band cut filter 5 and a change in light observed when the band cut filter 5 is used. First, the band cut filter 5 will be described with reference to accompanying drawings. FIG. 3 is a spectrum diagram showing transmittance of a band cut filter that is used in an example of the liquid crystal display device of the present invention. The band cut filter 5 is a band elimination filter that cuts (absorbs) a predetermined wavelength component included in light that passes therethrough. More in detail, the band cut filter 5 is a sheet-shaped, film-shaped, or plate-shaped optical element that is formed by using dye, pigment, or the like to absorb a predetermined wavelength component included in light passing therethrough and that converts energy of the absorbed wavelength component into heat.

With the band cut filter 5 characterized as shown in FIG. 3, transmittance abruptly falls in the vicinity of a wavelength of approximately 590 nm (in the vicinity of orange). That is, the band cut filter 5 absorbs a wavelength component of approximately 590 nm, and in the vicinity of the wavelength of 590 nm (a wavelength component of between approximately 550 nm and approximately 630 nm) included in light that passes therethrough. Hereinafter, the wavelength at which the transmittance is lowest (here, 590 nm) will be referred to as a peak absorptance wavelength (approximately 590 nm). That is, the peak absorptance wavelength of the band cut filter 5 having the characteristic shown in FIG. 3 is approximately 590 nm.

Light passing through the diffusion plate 3 and the optical sheet unit 4 is converted into light that is uniformized in a plane, and the spectrum distribution of the light is the same as that of the white LED lamp 21, that is, the spectrum distribution indicated by a dashed line in FIG. 2. When light from the optical sheet unit 4 passes through the band cut filter 5, a wavelength component of between approximately 550 nm and approximately 630 nm included in the light is absorbed by the band cut filter 5, which results in a spectrum distribution as indicated by a solid line in FIG. 2. The light that has passed through the band cut filter 5 is incident on, and passes through, the liquid crystal display panel 1. The liquid crystal adjusts intensity of the light incident on the liquid crystal panel 1, the color filter separates the light incident on the liquid crystal panel 1 into red light, green light, and blue light, and thereby, an image is displayed on the front surface of the liquid crystal display panel.

Figure 4:
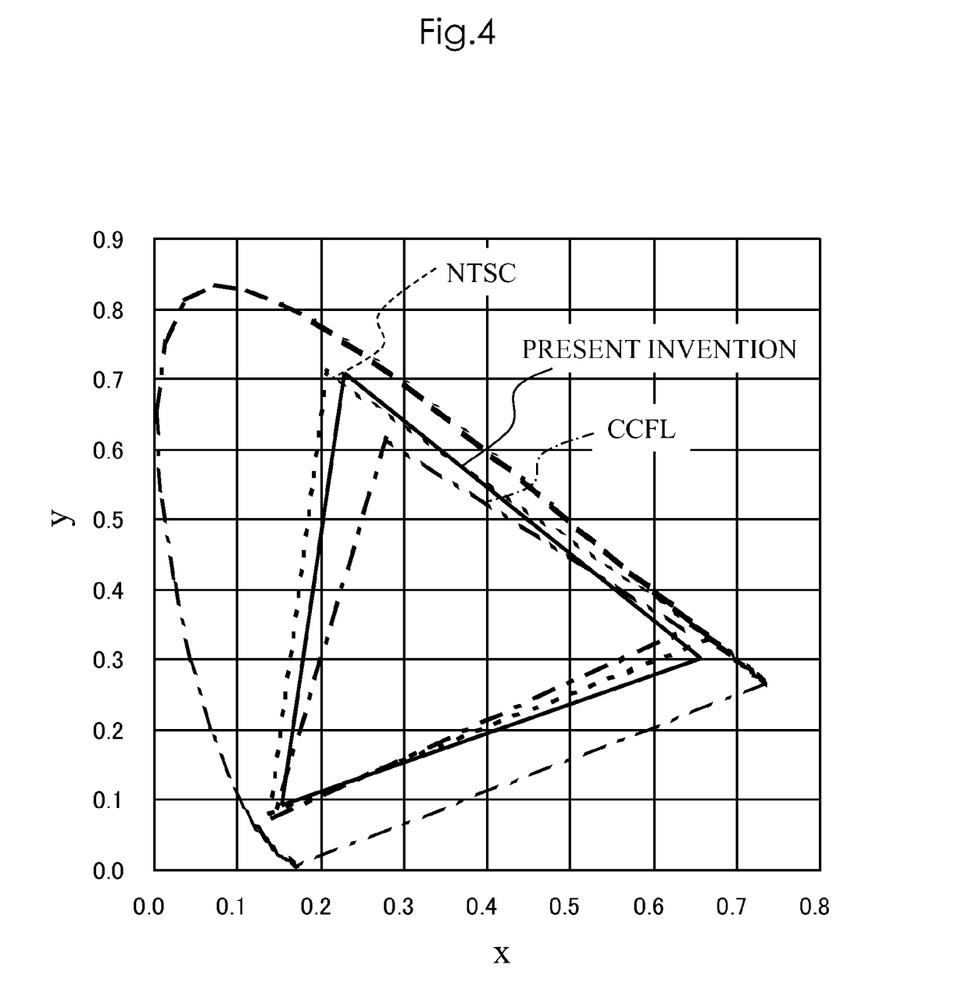
FIG. 4 is a CIE chromaticity diagram of liquid crystal display device of the present invention.

Next, a description will be given of color reproductivity of the liquid crystal display device of the present invention. FIG. 4 is a CIE chromaticity diagram of a liquid crystal display device. In FIG. 4, a dotted line indicates NTSC, a solid line indicates the liquid crystal display device of the present invention, and a dashed-dotted line indicates a liquid crystal display device provided with a CCFL. It is generally believed that liquid crystal display devices using a white LED lamp as a light source is inferior in red display, and thus the following descriptions will include particularly detailed descriptions of color reproductivity for red.

As show in FIG. 4, in comparison with the liquid crystal display device using a CCFL, the liquid crystal display device of the present invention is closer to NTSC in color reproductivity, and has high color reproductivity for all colors of red, green, and blue. More specifically, the liquid crystal display device A, which is provided with the band cut filter 5 whose peak absorptance wavelength is 590 nm (the band cut filter having the transmittance characteristic shown in FIG. 3), has color reproductivity that is 93% as high as NTSC, an x value of red chromaticity (which will sometimes be referred to as an x value below) that is 0.658, and a y value of red chromaticity (which will be sometimes referred to as a y value below) that is 0.301. With the liquid crystal display device (a conventional example) using a CCFL, the color reproductivity is 73% as high as NTSC, the x value of red chromaticity is 0.638, and the y value of red chromaticity is 0.343.

The color reproductivity of the liquid crystal display device A of the present invention, which is 93% as high as NTSC, is higher than that of the conventional example, which is 73% as high as NTSC. That is, the liquid crystal display device A of the present invention has higher color reproductivity than the liquid crystal display device using a CCFL as a light source. Besides, as is clear from comparison with respect to the red x value and the red y value, the liquid crystal display device of the present invention is capable of expressing deep red with chromaticity that is as high as or higher than red reproduced by the liquid crystal display device using a CCFL.

Figure 5:
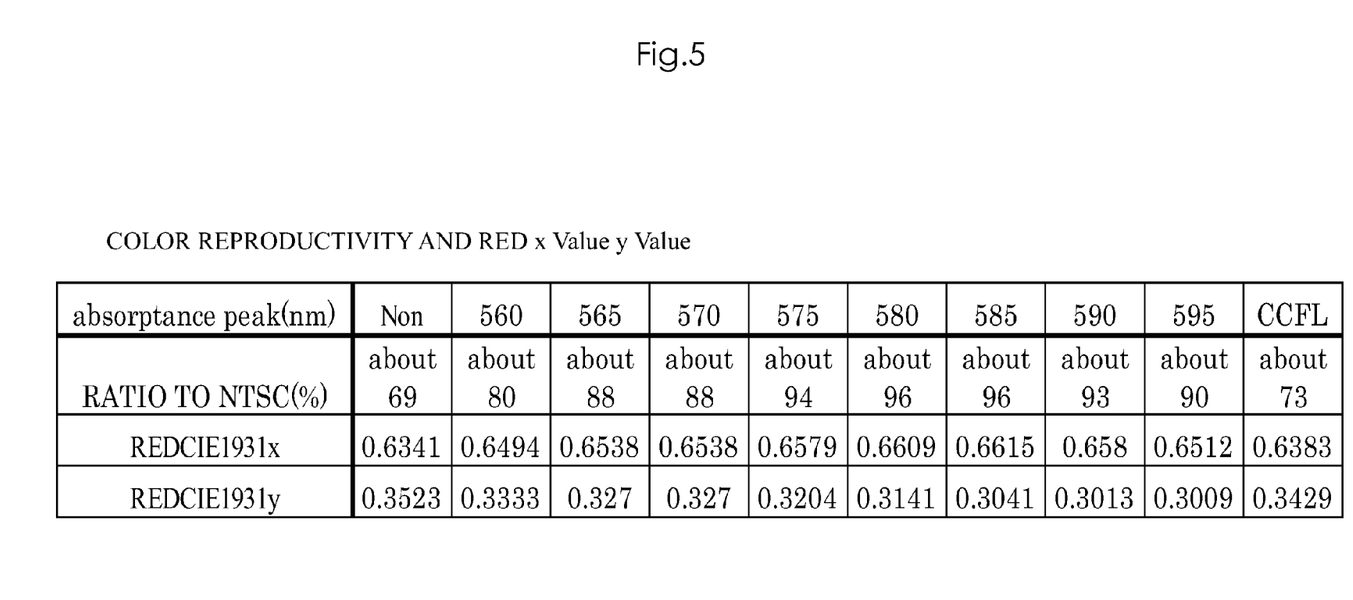
FIG. 5 is a table of color productivity and x, y values of red, measured by using band cut filters whose peak absorptance wavelengths are different stepwise from each other by 5 nm between 560 nm and 590 nm.

Next, in addition to the measurement carried out by using the band cut filter whose peak absorptance wavelength is 590 nm, measurement was carried out in the same manner by using band cut filters having different peak absorptance wavelengths. FIG. 5 is a table of NTSC-based ratios of color productivity and x, y values of red, measured by using band cut filters whose peak absorptance wavelengths are different stepwise from each other by 5 nm between 560 nm and 590 nm. Note that, in the table, values in a column under "none" are respectively an NTSC-based ratio of color productivity and x, y values of red in a case of using a liquid crystal display device where no band cut filter is used.

As shown in FIG. 5, a maximum ratio of color reproductivity in comparison to NTSC is 96% of a case where the peak wavelength is 580 nm or 585 nm, and, in the other cases, whether the peak wavelengths are smaller or larger than these wavelengths, the ratios of color reproductivity in comparison to NTSC are smaller than the maximum ratio. Besides, as shown in FIG. 5, a maximum x value of chromaticity is 0.662 of a case where the peak wavelength is 585 nm, and, in the other cases, whether the peak wavelengths are smaller or larger than this wavelength, the x values of chromaticity are smaller than the maximum x chromaticity value. Furthermore, a minimum y chromaticity value is 0.301, which is a y chromaticity value when the peak wavelength is 590 nm or 595 nm And, the smaller the peak wavelength is, the larger the y value of chromaticity is.

Among the example liquid crystal display devices using band cut filters shown in FIG. 5, the color reproductivity and the x value are minimum (and the y value is maximum) when the band cut filter whose peak absorptance wavelength is 560 nm is used. That is, with the liquid crystal display device using a band cut filter whose peak absorptance wavelength is 560 nm, the color reproductivity is 80% as high as NTSC, the x and y values of red chromaticity are 0.649 and 0.333, respectively. In contrast, with the conventional example, the color reproductivity is 73% as high as NTSC, and the x and y values of red chromaticity are 0.638 and 0.343, respectively.

That is, in comparison with a conventional liquid crystal display device using a CCFL as a light source, the liquid crystal display device using a band cut filter whose peak absorptance wavelength is 560 nm has a higher color reproductivity and is capable of expressing deeper red with chromaticity that is as high as or higher than red reproduced by the conventional liquid crystal display device using a CCFL as a light source. Furthermore, by using a band cut filter whose peak absorptance wavelength is longer than 560 nm, the liquid crystal display device of the present invention is improved in color reproductivity, red chromaticity, and deepness of red, in comparison with the liquid crystal display device using a band cut filter whose peak absorptance wavelength is 560 nm. Note that, as shown in FIG. 5, the color reproductivity and the x value and the y value of red chromaticity are the most preferable when a band cut filter whose peak absorptance wavelength is between 580 nm and 590 nm is used.

It is presumable, from FIG. 5, that a liquid crystal display device using a band cut filter whose peak absorptance wavelength is approximately 530 nm has color reproductivity and red chromaticity that are as high as those of a liquid crystal display device using a CCFL. Further, in a case of a band cut filter whose peak absorptance wavelength is 595 nm, many wavelength components in the red range are absorbed.

From the above discussion, it can be said that a band cut filter whose peak absorptance wavelength is between 530 nm and 590 nm is suitable as a band cut filter to be provided in the liquid crystal display device of the present invention. By using such a band cut filter, it is possible, even with a liquid crystal display device using a color filter for a CCFL, to achieve color reproductivity that is as high as, or higher than, that of a liquid crystal display device using a CCFL. Furthermore, with respect to expression of red, in which a liquid crystal display device using an LED lamp has conventionally been inferior, it is possible to express deep red having chromaticity that is as high as or higher than that of a liquid crystal display device using a CCFL. Note that, in order to securely achieve higher color reproductivity and express deeper red of higher red chromaticity in comparison with a case where a CCFL is used, it is preferable to use a band cut filter whose peak absorptance wavelength is between 560 nm and 590 nm.

The band cut filter 5 is a band cut filter that is the most suitable for a liquid crystal display device having a backlight unit using as a light source a white LED lamp provided with a blue LED element and a YAG fluorescence substance. The band cut filter 5 also helps achieve the same advantages (improved color reproductivity, improved red chromaticity, and improved response speed of liquid crystal) even in a liquid crystal display device provided with a backlight unit that uses as a light source a white LED lamp including a blue LED element, a green fluorescence substance, and a red fluorescence substance, although with a different efficiency. There may be used a band cut filter whose peak absorptance wavelength corresponds to the spectrum distribution of light emitted from the white LED lamp. The band cut filter may be selected widely from various band cut filters that are capable of absorbing wavelength components in a specific range, such that spectrum distribution of light that has passed through the band cut filter has three peaks as indicated by the solid line in FIG. 2.

In addition, the band cut filter 5 converts absorbed light into heat, and warms the liquid crystal panel with the heat. In the liquid crystal display device of the present invention, the liquid crystal panel 11 is warmed to approximately 40° C. A temperature of the liquid crystal panel 11 is of a same level as a temperature of a liquid crystal panel in a liquid crystal display device using a CCFL. That is, with the liquid crystal display device using the band cut filter 5 according to the present invention, it is possible to achieve a liquid crystal response speed of a same level as can be achieved by a liquid crystal display device using a CCFL, without using warming means such as a heater. Thus, it is possible to reduce degradation of the display quality caused by degradation of the liquid crystal response speed.

Incident light on the band cut filter 5 is uniformized by the diffusion plate 3 and the optical sheet unit 4, and thus the band cut filter 5 generates heat uniformly in a plane thereof.

Thereby, the liquid crystal panel 11 is also warmed uniformly and evenly, which helps reduce occurrence of distribution of liquid crystal response speed caused by temperature distribution. Thus, it is possible to reduce degradation of image quality caused by variation in response speed.

The band cut filter 5 absorbs light and generate heat to warm the liquid crystal panel 11. To warm the liquid crystal panel 11 efficiently, it is preferable, as in the above embodiments, to dispose the band cut filter 5 between the liquid crystal display panel 2 and the optical sheet unit 4. However, since the liquid crystal display device A itself is a thin device, it is possible to warm the liquid crystal panel 21 to a temperature that makes it possible to reduce degradation of the liquid crystal response speed whether the band cut filter is disposed, for example, between the plurality of optical sheets included in the optical sheet unit 4, between the optical sheet unit 4 and the diffusion plate 3, or between the diffusion plate 3 and the backlight unit 2.

As is described hereinabove, the liquid crystal display device A uses what is called a direct type backlight unit, and is configured such that the backlight unit 2 provided with the plurality of white LED lamps 21 which are two-dimensionally arranged on the substrate 20 is disposed at the rear side of the liquid crystal display panel 1. In addition to this configuration, it is possible to obtain the same advantages with what is called an edge light type backlight unit that uses a light guide plate.

Figure 6:
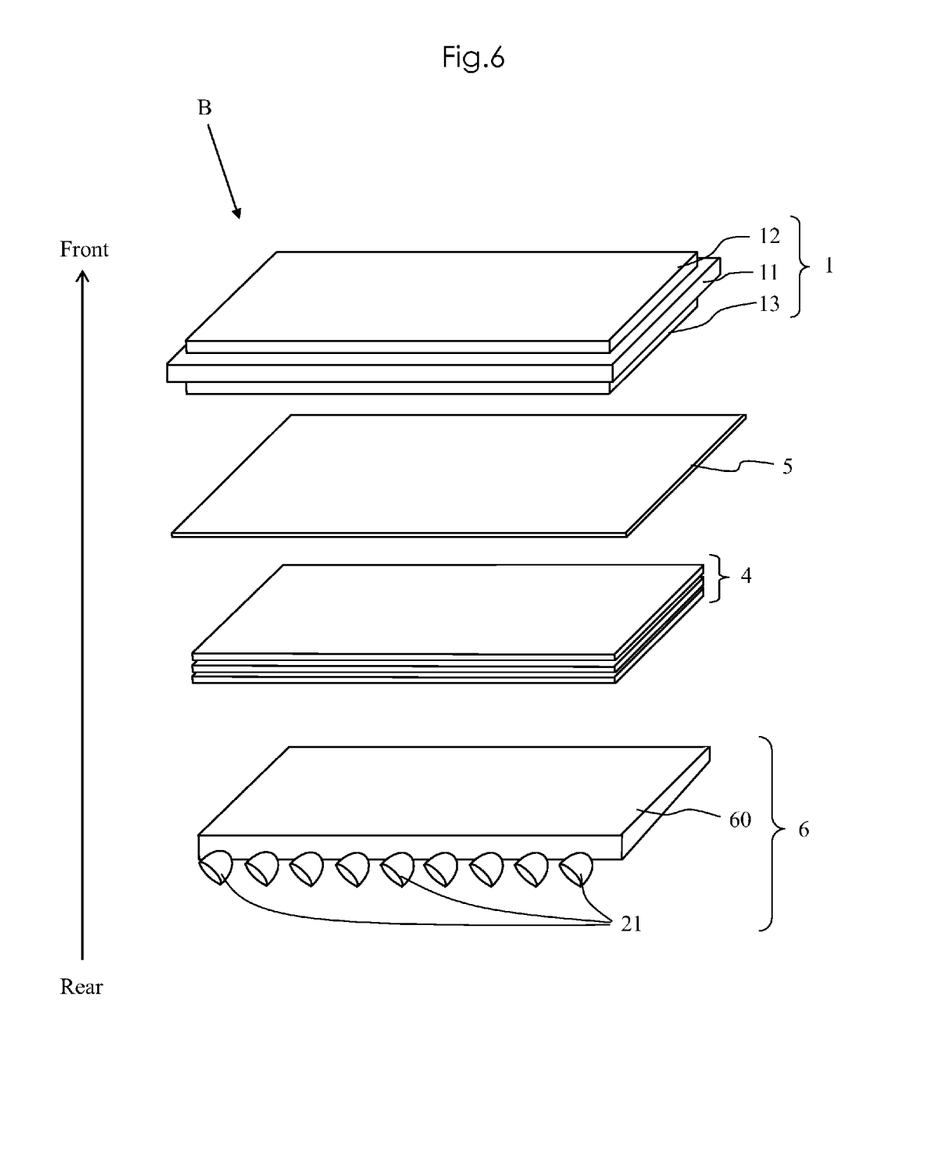
FIG. 6 is an exploded perspective view of another example of the liquid crystal display device according to the present invention.

Next, a description will be given of a liquid crystal display device provided with an edge light type backlight unit. FIG. 6 is an exploded perspective view of another example of the liquid crystal display device according to the present invention. A liquid crystal display device B shown in FIG. 6 is provided with an edge light type backlight. The liquid crystal display device B has the same configuration as the liquid crystal display device A except that it has a backlight unit 6 which is different from the backlight unit 2 of the liquid crystal display device A, and thus substantially the same parts and portions will be denoted by the same signs, and detailed descriptions thereof will be omitted. Note that a band cut filter 5 included in the liquid crystal display device B has the characteristic shown in FIG. 3, that is, the peak absorptance wavelength thereof is approximately 590 nm.

As shown in FIG. 6, the liquid crystal display device B is provided with a liquid crystal display panel 1, a backlight unit 6, an optical sheet unit 4, and the band cut filter 5. The backlight unit 6 is an edge light type backlight, provided with a light guide plate 60 and a plurality of white LED lamps 21 which are disposed facing a side surface of the light guide plate 60 and emit light toward the light guide plate 60. In the liquid crystal display device B, the light guide plate 60 also has the function of the diffusion plate 3 which is used in the liquid crystal display device A. Incidentally, there is a liquid crystal display device configured such that a diffusion plate is provided separately from the light guide plate 60.

Light emitted from the white LED lamps 21 is reflected inside the light guide plate 60 to be incident on the optical sheet unit 4 as planar light. The light is scattered, diffused, and collected as described above to be incident on the band cut filter 5 as planar light having a uniform brightness distribution. The band cut filter 5 absorbs a wavelength component of between approximately 550 nm and approximately 630 nm included in the light that passes therethrough.

Light leaving the optical sheet unit 4 passes through the band cut filter 5, when a wavelength component of between approximately 550 nm and approximately 630 nm included in the light is absorbed by the band cut filter 5. Energy of the absorbed wavelength component is converted into heat by the band cut filter 5. The heat is used to warm the liquid crystal panel 11 to increase the liquid crystal response speed.

Incident light on the band cut filter 5 is uniformized by the light guide plate 60 and the optical sheet unit 4, and thus, the band cut filter 5 generates heat uniformly in a plane thereof that is irradiated with the light. The liquid crystal panel 11 is warmed by this heat, and thus, temperature distribution is hard to occur, which in turn makes it difficult for response speed distribution to occur. Thus, it is possible to reduce degradation of image quality caused by variation in liquid crystal response speed. Color reproductivity and red chromaticity of the liquid crystal display device B are the same as described with respect to the liquid crystal display device A, and detailed descriptions thereof will be omitted.

By using the liquid crystal display device according to the present invention, even with a color filter that is used in a liquid crystal display device provided with a CCFL, it is possible to achieve color reproductivity that is as high as, or higher than, that of a liquid crystal display device provided with a CCFL. Furthermore, it is possible to express red with higher chromaticity, or, deeper red, than with a liquid crystal display device provided with a CCFL.

The white LED lamp used in the above-described embodiments is one configured such that a YAG fluorescence substance is put over a blue LED element to mix blue light and yellow light, but this is not meant as a limitation, and it is possible to use a white LED lamp (a highly color rendering LED lamp) that is provided with a blue LED element, a green fluorescence substance, and a red fluorescence substance. Even in this case, it is possible, by using a color filter for a CCFL, to obtain color reproductivity that is as high as, or higher than, that of a liquid crystal display device using a CCFL. Furthermore, it is possible to express deeper red, or red with higher chromaticity, than with a liquid crystal display device using a CCFL.

With the liquid crystal display device according to the above-described embodiments, even by using a color filter for a liquid crystal display device using a CCFL instead of a dedicated color filter whose transmittance and transmission band is adjusted for a white LED lamp, it is possible to achieve color reproductivity as high as or higher than a conventional liquid crystal display device using a CCFL, and to express deep red with chromaticity that is as high as or higher than the conventional liquid crystal display device.

This eliminates the need of changing a color-filter production line in a production line, making it possible to reduce the number of times to stop the production line, and cost increase caused by changing of materials. Furthermore, it is possible to warm the liquid crystal panel with heat generated by the band cut filter, to thereby reduce degradation of the liquid crystal response speed. With this configuration, there is no need of separately providing a heater for warming the liquid crystal panel, and this makes it possible to achieve a simple configuration; and further, since there in no need for power for driving a heater, it is possible to reduce energy consumption in the liquid crystal display device.

The band cut filter absorbs light to generate heat and is provided for the purpose of heating the liquid crystal panel, and for efficient warming of the liquid crystal panel, it is preferable to dispose the band cut filter between the liquid crystal display panel and the optical sheet unit as in the embodiment described above. However, since the liquid crystal display device itself is a thin device, the band cut filter may be disposed, for example, either between the plurality of optical sheets included in the optical sheet unit or between the optical sheet unit and the light guide plate. It is possible to adopt, as the band cut filter to be disposed between the optical sheets, one that is provided with the effect of an optical sheet constituting the optical sheet unit. Furthermore, in the case of an edge light type liquid crystal display device where a diffusion plate is provided separately from a light guide plate, the band cut filter may be disposed, in addition to the above-mentioned locations, between the diffusion plate and the light guide plate.

The band cut filters 5 used in the liquid crystal display devices dealt with in the above-described embodiments are formed in a sheet shape; however, in addition to the sheet shape, the band cut filters may be formed in a plate shape or a film shape. This, however, is not meant as a limitation. For example, the same function of absorbing a specific wavelength component as is given to the band cut filter may be given to the array substrate itself or the counter substrate itself of the liquid crystal panel 21, or to a resin inter-layer insulating film used on the array substrate of the liquid crystal display panel 21. Or, the same function of absorbing a specific wavelength component as is given to the band cut filter may be given to an optical element through which white light emitted from the backlight unit passes, as an additional function. Methods of producing an optical element provided with the band-cut-filter function of absorbing a specific wavelength component include, for example, a method of applying, or fixing by spraying, a pigment or a dye used in the band cut filter to a surface of an optical element constituting a liquid crystal display device.

Industrial Applicability

The present invention may be suitably used as a display device for apparatuses such as a thin television apparatus, a thin display device, and a mobile phone.

LIST OF REFERENCE SYMBOLS

1 liquid crystal display panel
11 liquid crystal panel
12 polarization plate
13 polarization plate
2 backlight unit
20 substrate
21 white LED lamp
3 diffusion plate
4 optical sheet unit
5 band cut filter
6 light guide plate

The invention claimed is:

1. A liquid crystal display device, comprising: a liquid crystal display panel; and backlight unit disposed at a rear side of the liquid crystal display panel, wherein
the backlight includes a white LED lamp that emits white light having intensity peaks at least two different wavelengths; and
the liquid crystal display device includes a specific wavelength component absorbing portion located on the backlight side of the liquid crystal display panel that absorbs a wavelength component in a range in the vicinity of orange from the white light that passes through the specific wavelength component absorbing portion.

2. The liquid crystal display device according to claim 1, wherein
the specific wavelength component absorbing portion converts energy of absorbed light into heat.

3. The liquid crystal display device according to claim 1, wherein
the specific wavelength component absorbing portion is a band cut filter in a sheet-shape, a film-shape, or a plate-shape; and the band cut filter is disposed between the liquid crystal display panel and the backlight unit.

4. The liquid crystal display device according to claim 3, wherein
the band cut filter is disposed between the liquid crystal display panel and an optical sheet unit that includes one optical sheet or a plurality of optical sheets.

5. The liquid crystal display device according to claim 3, wherein
the band cut filter is disposed between a plurality of optical sheets included in an optical sheet unit.

6. The liquid crystal display device according to claim 3, wherein
the band cut filter is disposed between an optical sheet unit that includes one optical sheet or a plurality of optical sheets and a diffusion plate disposed at a front side of the backlight unit.

7. The liquid crystal display device according to claim 3, wherein
the band cut filter is disposed between the backlight unit and a diffusion plate disposed at a front side of the backlight unit.

8. The liquid crystal display device according to claim 3, wherein
the band cut filter also has a function of an optical sheet included in an optical sheet unit that includes one optical sheet or a plurality of optical sheets, the band cut filter being disposed in the optical sheet unit.

9. The liquid crystal display device according to claim 3, wherein
the backlight unit includes a light guide plate that has a light exit surface provided on the liquid crystal display panel side and a light entrance surface provided at a periphery of the light exit surface;
the light guide plate also serves as a diffusion plate; and
the band cut filter is disposed between an optical sheet unit that includes one optical sheet or a plurality of optical sheets and the backlight unit.

10. The liquid crystal display device according to claim 1, wherein
the white LED lamp includes an LED element and a fluorescence substance that is excited by light emitted from the LED element to emit light having a different wavelength from the light emitted from the LED element.

11. The liquid crystal display device according to claim 10, wherein
the white LED lamp is a lamp that includes a blue LED element and a YAG fluorescence substance.

12. The liquid crystal display device according to claim 11, wherein
a peak absorptance wavelength of the specific wavelength component absorbing portion is a wavelength between 560 nm and 590 nm.

13. The liquid crystal display device according to claim 10, wherein
the white LED lamp is a lamp that includes a blue LED element, a green fluorescence substance, and a red fluorescence substance.

14. The liquid crystal display device according to claim 11, wherein
a peak absorptance wavelength of the specific wavelength component absorbing portion is a wavelength between 530 nm and 590 nm.

* * * * *